No. 844,826. PATENTED FEB. 19, 1907.
J. A. MOULS.
BASKET, HAMPER, &c.
APPLICATION FILED AUG. 21, 1905.

2 SHEETS—SHEET 1.

No. 844,826. PATENTED FEB. 19, 1907.
J. A. MOULS.
BASKET, HAMPER, &c.
APPLICATION FILED AUG. 21, 1905.

2 SHEETS—SHEET 2.

UNITED STATES PATENT OFFICE.

JOSEPH ALPHONSE MOULS, OF LAFITTE, FRANCE.

BASKET, HAMPER, &c.

No. 844,826.   Specification of Letters Patent.   Patented Feb. 19, 1907.

Application filed August 21, 1905. Serial No. 275,149.

*To all whom it may concern:*

Be it known that I, JOSEPH ALPHONSE MOULS, a citizen of the Republic of France, residing at Lafitte, Department Tarn-et-Garonne, Republic of France, have invented certain new and useful Improvements in Baskets, Hampers, and the Like, of which the following is a full, clear, and exact specification.

This invention relates to improvements in baskets, hampers, and the like, and aims especially at providing a basket-seat for fishing composed of pieces of wood suitably arranged and polished, part of which serves as a skeleton for a covering or weaving of cane or ratan. This basket may contain fish or provisions and may be used as a seat for the angler or like user.

Figure 1:
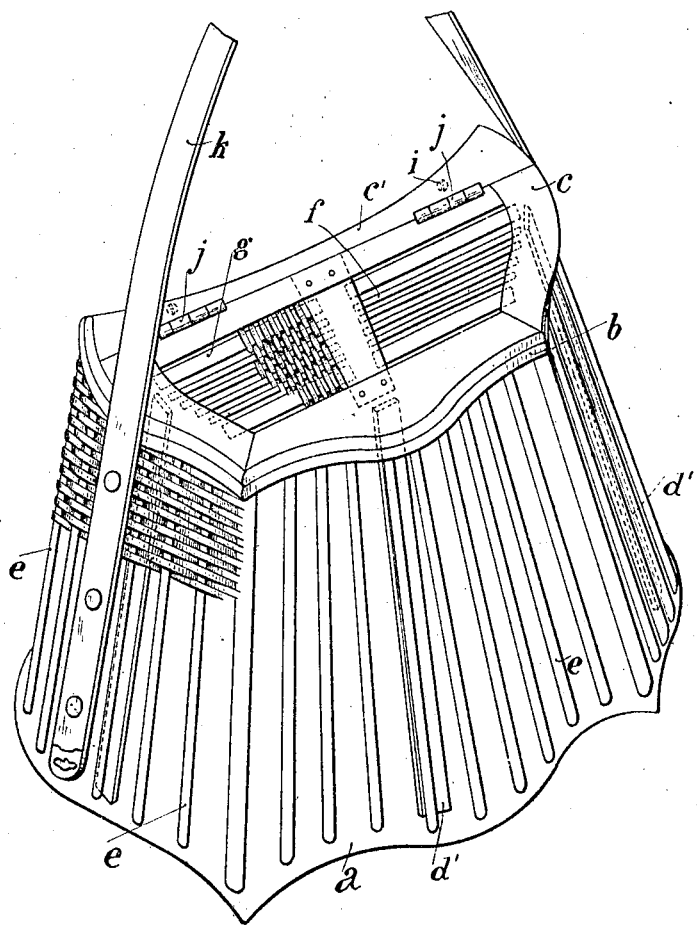
Figure 2:
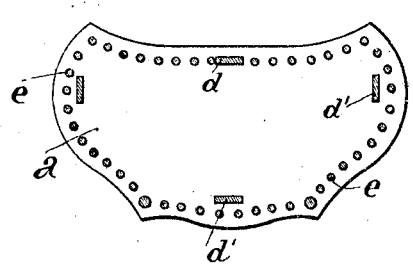
Figure 3:
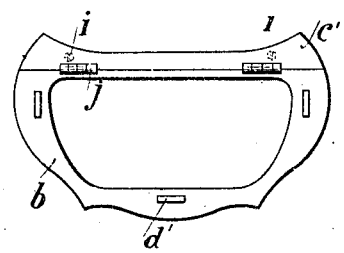
Figure 4:
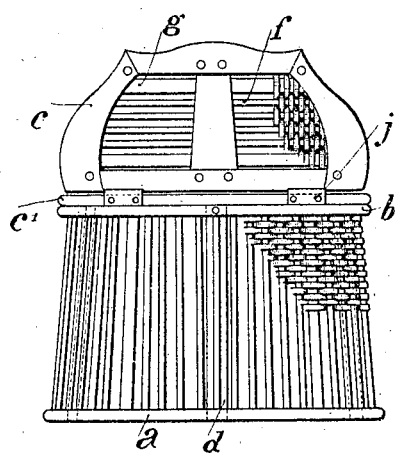

The accompanying drawings represent in Figure 1, one method of forming such a basket-seat, a part of which is deprived of the weaving or wicker-work in order that the skeleton may be seen. Figs. 2, 3, 4, and 5 are detail views.

The said basket consists of four chief parts—first, the bottom or base $a$; secondly, the framing of the upper part $b$; thirdly, the cover or lid $c$, connected by hinges $c'$ to a piece fixed upon the framework $b$; fourthly, the body of the basket, comprising elements connecting the bottom $a$ to the framework $b$ in order to constitute an inseparable whole. These elements are composed of unyielding uprights $d\ d'$ and also cylindrical small sticks or canes $e$, around or upon which the wicker-work is plaited or entwined.

The shape of the basket may be varied according to requirements. For instance, the base can be composed of one solid piece or of parts assembled with plaiting or wicker-work in the spaces similar to the cover. The construction of such a basket, with the plaiting or wicker-work at the bottom and cover, may be carried out as follows: Some boards of dry and tough wood from ten to twelve millimeters thick are taken, upon which the form of each piece is marked by means of suitable gages, and they are then cut up and introduced into the cavities or molds destined to keep them in position in order to permit of the necessary mortises and tenons being easily made. Then into the holes of the base and cover the holes of the round or flat small sticks or canes $f$ or $g$, upon which the plaiting is to be done, are marked and pierced. Next in turn the portion of these pieces which is to touch the weaving or wicker-work is polished at the interior only. The assembling with the said small sticks or canes is then proceeded with by gluing them to the tenons and mortises, and the joints are pinned with the strong wooden pegs, thus effecting a perfect locking of the whole. The flat small sticks or canes $g$ are sufficiently large to be very unyielding, and between these small sticks or canes and the frame there is only enough room for the reeds or osiers. The base and cover are now ready for weaving or threading in any suitable way, which takes place.

Figure 5:
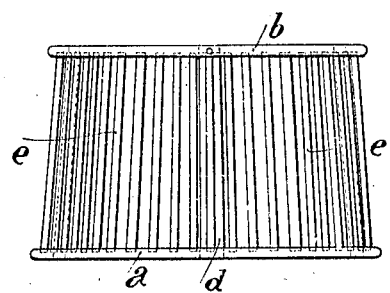

In order to mount the body of the basket, the position of the holes for the passage of the uprights $d$ and of the small sticks or canes $e$ are marked upon the base $a$ and on the frame $b$, the mortises of the uprights are completely pierced, and the holes of the small sticks only three-quarters of the thickness of the wood, Fig. 5; but before mounting the piece $c'$ upon the frame $b$ is fixed by the means of two screws $i$, the heads of which are inside, and the hinges $j$ of the lid or cover $c$ are placed in position, without, however, leaving the latter mounted, as this would hinder the continuation of the operations. Having given the uprights and small sticks the convenient form and length as well as the required polish, the uprights of the bottom only are glued together, and then the whole is connected by fastening to the bottom of the basket and to the upper frame in order to insure a reliable cohesion and great solidity. Then the uprights are again wedged in by the pegs traversing the tenons into the thick part of the base and the frame. The back upright $d$ is placed preferably in alinement with the adjacent range of small sticks or canes, while the others, $d'$, are inside the small sticks or canes at a sufficient distance to permit the passage of the ratan twisted cane or osiers, which can then be used to plait the body of the basket in any suitable way. The weaving being completely terminated, the cover is definitely mounted upon the hinges, and after a general polishing the whole is varnished. Then, if desired, a strap or belt $k$ may be fixed by means of hooks running across the plaiting to permit of the basket being easily carried. The base and the cover can consist of an entire solid piece of wood without wicker-work, which simplifies the work, the mounting and the weaving of the body of the basket being carried out as before described. A basket thus constructed may be used for containing all objects or provisions and at the same time form a solid and elegant seat.

Having now particularly described and ascertained the nature of my said invention and in what manner the same is to be performed, I declare that what I claim is—

A frame for a basket, hamper or the like comprising a bottom plate $a$ and a top frame $b$ of corresponding configuration, studs $d, d'$, and rods $e$ between the two, securely uniting the frame to the bottom plate, a strip $c'$ fastened to the top frame and a lid hinged to said strip, substantially as described.

In testimony whereof I affix my signature.

JOSEPH ALPHONSE MOULS.

In presence of—
GERAUD DESCAZEAUX,
GUILLAUME PALÉMOY.